C. E. A. MERROW.
ILLUSION APPARATUS.
APPLICATION FILED JUNE 27, 1910.

973,449.

Patented Oct. 18, 1910.

Witnesses:
Powell F. Hatch
Burton W. Cary

Inventor:
Charles E. A. Merrow
by his Attorneys
Phillips Van Everen
& Fish

THE NORRIS PETERS CO., WASHINGTON, D. C.

UNITED STATES PATENT OFFICE.

CHARLES E. A. MERROW, OF HYDE PARK, MASSACHUSETTS.

ILLUSION APPARATUS.

973,449.  Specification of Letters Patent.  Patented Oct. 18, 1910.

Application filed June 27, 1910.  Serial No. 568,978.

*To all whom it may concern:*

Be it known that I, CHARLES E. A. MERROW, a citizen of the United States, residing at Hyde Park, in the county of Norfolk and State of Massachusetts, have invented certain new and useful Improvements in Illusion Apparatus; and I do hereby declare the following to be a full, clear, and exact description of the invention, such as will enable others skilled in the art to which it appertains to make and use the same.

The present invention relates to certain new and useful improvements in illusion apparatus.

The particular type of illusion apparatus to which the invention pertains comprises a reflecting mirror mounted upon a suitable support and adapted to show an image of a design or drawing which is placed upon the support. The observer looks into the mirror from above, the object upon the support being hidden from the direct vision of the observer by a shield. This type of apparatus is generally employed for amusement purposes and the endeavor of the person using it is to draw any predetermined figure upon a sheet of paper resting upon the support by looking into the mirror from above and observing the reflection of the pencil and paper which are hidden by the shield from the direct vision of the operator.

The object of this invention is to provide a device of this character which shall be simple, easily constructed and of considerable rigidity when the various parts are extended in operative relation to one another.

A further object of the invention is to provide an apparatus which may be quickly and easily folded into a compact form and occupy a comparatively small space when not in use.

With the above ends in view the invention contemplates the following features which will be more specifically described in the specification and defined in the appended claims.

Figure 1:
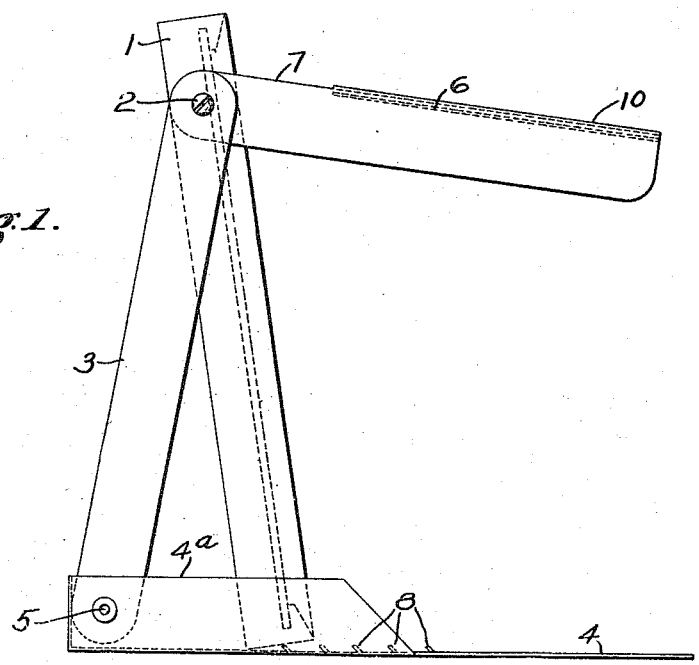
Figure 2:
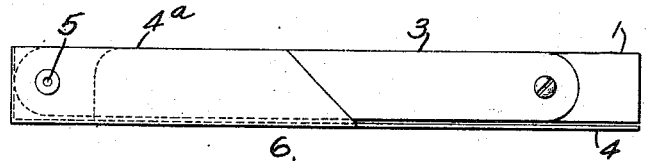
Figure 3:
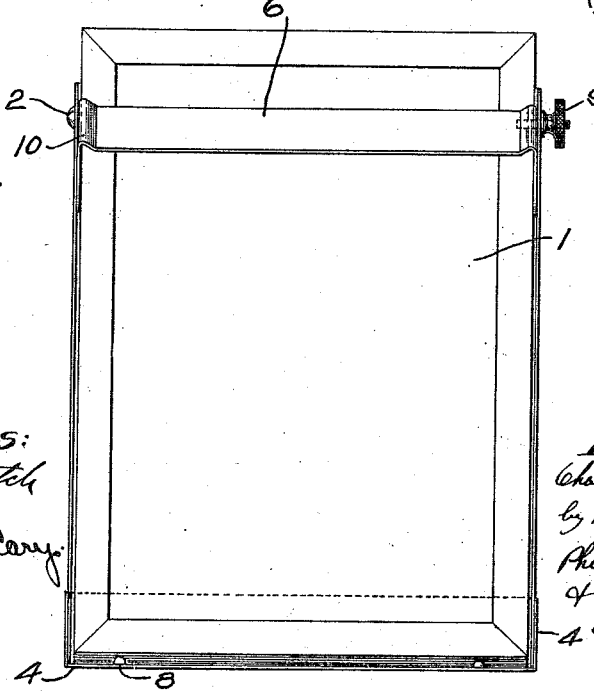

In the accompanying drawing, illustrating the preferred form of the invention, Figure 1 represents a side elevation of the improved illusion apparatus with the parts extended in operative relation to one another. Fig. 2 is a side elevation of the apparatus with the various parts folded together and Fig. 3 is a front elevation of the apparatus shown in Fig. 1.

In the illustrated embodiment of the invention, the mirror 1 is shown as pivotally mounted at 2 between the free ends of the links 3 which are pivotally connected at 5 to the flanged portions 4ª of the support 4. In order that the various parts may be all folded together in a compact relation to one another, the shield 6 is also attached at 2 to the links 3. The shield 6, when in its working position, extends out approximately parallel to the support 4 and cuts off the view of objects upon the support from the direct vision of the operator looking down from above. In order that the operator may look directly into the mirror 1 however, and observe the reflection of any object upon the support therein, the shield 6 is cut away at 7. The mirror 1 may be adjusted to different angles in order to vary the position of the image, by moving the foot of the mirror along the support 4 where it is held in any desired position by a series of tangs or projections 8 which are struck up from the support. The shield 6 may also be adjusted to various positions and held by a thumb screw 9 which locks the shield 6 and mirror 1 in position when it is tightened.

When it is desired to fold the apparatus up when not in use the shield 6 is swung down against the mirror 1 and the mirror and shield together with the links 3 are then folded down upon the support 4. In order that the shield 6 may lie flat upon the support 4 when the apparatus is folded up, it is dished or bent slightly inward at 10 as shown clearly in Fig. 3. This allows sufficient space for the tangs 8 when the shield lies upon the support 4.

It can now readily be seen that with the above described arrangement of parts, a very simple, compact structure is obtained and which may be easily folded up into a small space when not in use. It is considered preferable to stamp the various parts, comprising the apparatus, out of sheet metal as this method of construction enables the device to be readily constructed. It is to be understood, however, that any other convenient material and method of construction may be employed if so desired.

My invention is not limited to the embodiment hereinbefore specifically described and illustrated in the accompanying drawing, but may be embodied in other forms within the nature of the invention and the scope of the following claims.

I claim—

1. An illusion apparatus, having, in combination, a support, a mirror capable of angular adjustment relatively to the support and a shield mounted adjacent to the mirror above the support and adapted to allow only a reflected view of the support or objects thereon from above, substantially as described.

2. An illusion apparatus, having, in combination, a support, a plurality of links pivotally connected to the support, a mirror and a shield pivotally connected between the free ends of the links whereby the apparatus may be folded into a compact form, substantially as described.

3. An illusion apparatus, having, in combination, a support, a mirror capable of angular adjustment relatively to the support, a plurality of projections upon the support against which the foot of the mirror rests and a shield mounted adjacent the mirror above the support and adapted to allow only a reflected view of the support and objects thereon from above, substantially as described.

4. An illusion apparatus, having, in combination, a support, a mirror capable of angular adjustment relatively to the support, a plurality of projections upon the support against which the foot of the mirror rests, a shield mounted adjacent to the mirror above the support and adapted to allow only a reflected view of the support and objects thereon from above, the shield being dished inwardly whereby the shield is enabled to lie flat upon the support when the apparatus is not in use, substantially as described.

5. An illusion apparatus, having, in combination, a support, a mirror angularly adjustable relatively to the support and a shield angularly adjustable relatively to the support and mirror and adapted to allow only a reflected view of the support and objects thereon from above, substantially as described.

CHARLES E. A. MERROW.

Witnesses:
 WARREN G. OGDEN,
 FRED O. FISH.